(12) United States Patent
Evangelist et al.

(10) Patent No.: US 7,996,265 B2
(45) Date of Patent: Aug. 9, 2011

(54) SYSTEM AND METHOD FOR FULFILLING A MEDIA REQUEST

(75) Inventors: Shane N Evangelist, Irving, TX (US); Joseph W. Craft, IV, Frisco, TX (US); Leslie D. Crook, Dallas, TX (US); John D. Taylor, Plano, TX (US); John F. Butler, Plano, TX (US)

(73) Assignee: Blockbuster L.L.C., Englewood, CO (US)

( * ) Notice: Subject to any disclaimer, the term of this patent is extended or adjusted under 35 U.S.C. 154(b) by 1357 days.

(21) Appl. No.: 11/133,874

(22) Filed: May 19, 2005

(65) Prior Publication Data

US 2006/0265286 A1 Nov. 23, 2006

(51) Int. Cl.
*G06G 1/14* (2006.01)
*G06Q 50/00* (2006.01)

(52) U.S. Cl. .......................................... 705/22; 705/10

(58) Field of Classification Search ............... 705/22–28
See application file for complete search history.

(56) References Cited

U.S. PATENT DOCUMENTS

| | | | |
|---|---|---|---|
| 6,415,261 B1 | 7/2002 | Cybul et al. ........................ | 705/14 |
| 6,584,450 B1 | 6/2003 | Hastings et al. ................ | 705/26 |
| 6,655,580 B1 | 12/2003 | Ergo et al. ........................ | 235/375 |
| 6,868,403 B1 | 3/2005 | Wiser et al. ...................... | 705/51 |
| 7,546,252 B2 | 6/2009 | Hastings et al. | |
| 2005/0060210 A1* | 3/2005 | Levi et al. ........................ | 705/5 |
| 2005/0091164 A1* | 4/2005 | Varble .............................. | 705/52 |
| 2007/0050266 A1* | 3/2007 | Barber et al. ................... | 705/26 |
| 2008/0249843 A1* | 10/2008 | Gross .............................. | 705/10 |

OTHER PUBLICATIONS

Robert Barker, "Can Netflix Keep Spinning Gold" BusinessWeek 112, No. 3829, English (Copyright 2003 McGraw-Hill, Inc.).*
Business Release, "Blockbuster Launches New Online DVD Rental Service," 4 pgs., Aug. 11, 2004.
Robert Barker, "Can Netflix Keep Spinning Gold?," BusinessWeek 112, No. 3829, English (Copyright 2003 McGraw-Hill, Inc.), 2 pgs., Apr. 21, 2003.
D.C. Wynn, P.M. Williams, M.G. Simons, N.F. Wilkins, A. Macrow, N.A. Duffy, A. Eng, M.J. Doherty, and D.M. Groves, "System and Method for Provisioning Audiovisual Works," U.S. Appl. No. 10/842,147, 37 pgs., May 10, 2004.
USPTO Office Action, U.S. Appl. No. 11/172,731, Inventor Evangelist, 9 pages, Feb. 6, 2009.
USPTO Office Action, U.S. Appl. No. 11/172,731, Inventor Evangelist, 9 pages, Aug. 5, 2009.

* cited by examiner

*Primary Examiner* — Matthew S Gart
*Assistant Examiner* — Garcia Ade

(57) ABSTRACT

A system and method for fulfilling a media request includes receiving a media request associated with a subscriber account. One inventory location is selected from a plurality of inventory locations to fulfill the media request, and at least one of the inventory locations accommodates in-store media rental requests.

23 Claims, 4 Drawing Sheets

SYSTEM AND METHOD FOR FULFILLING A MEDIA REQUEST

TECHNICAL FIELD OF THE INVENTION

This invention relates generally to the field of media, and more particularly, to a system and method for fulfilling a media request.

BACKGROUND

Traditionally, the rental of audiovisual works, such as movies, involves visiting a local retail establishment, such as a video store. A customer browses the store to select movies to rent, and completes the transaction through a traditional point-of-sale checkout. More recently, on-line subscription services provide alternative techniques for customers to rent movies and for rental businesses to fulfill these rental requests.

SUMMARY OF THE DISCLOSURE

In accordance with the present invention, disadvantages and problems associated with fulfilling media requests may be reduced or eliminated.

According to one embodiment of the present invention, a system and method for fulfilling a media request includes receiving a media request associated with a subscriber account. One inventory location is selected from a plurality of inventory locations to fulfill the media request, and at least one of the inventory locations accommodates in-store media rental requests.

Certain embodiments of the invention may provide one or more technical advantages. A technical advantage of one embodiment includes providing an efficient method of providing a customer with rented media. The system analyzes various criteria and selects an inventory location to fulfill a customer request. Inventory locations may include both fulfillment centers and stores, where the stores can allocate inventory for both on-line and in-store fulfillment. Another technical advantage of an embodiment includes monitoring the activity of rentals and adjusting the inventory based on the rental activity. Adjusting the inventory to meet customer demand also promotes efficient operations and higher customer satisfaction.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5, like numerals being used for like and corresponding parts of the various drawings.

Figure 1:
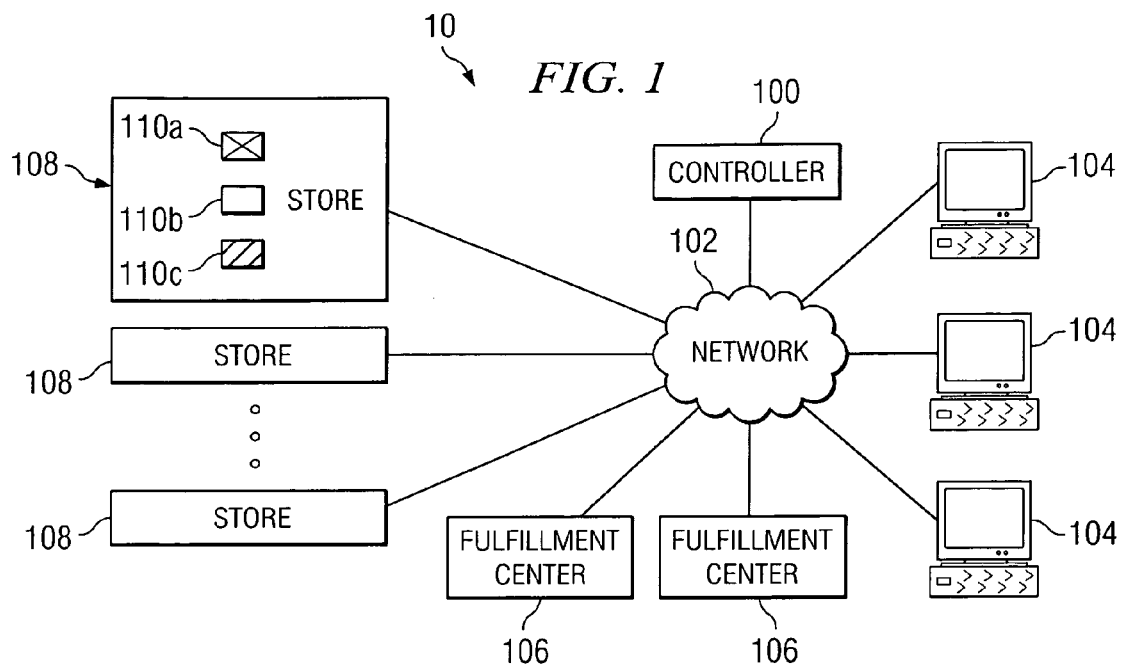
FIG. 1 illustrates a system that fulfills media requests.

FIG. 1 illustrates a system 10 that provides for fulfillment of media requests. System 10 includes a controller 100, a network 102, customers 104, fulfillments centers 106, and stores 108. Customers 104 interact with controller 100 through network 102 to request media, which may be fulfilled by fulfillment centers 106 or stores 108. Stores 108 may also fulfill traditional media rental requests from customers who visit stores 108. Fulfillment centers 106 and stores 108 may be individually or collectively referred to as inventory locations.

According to the illustrated embodiment, system 10 includes controller 100 that selects an inventory location to fulfill a received media request. The media request may be to purchase media or rent media. As used herein, media represents any audio and/or visual information encoded in disks, compact disks (CDs), digital video disks (DVDs), or other memory device, or any audio and/or visual information encoded in a suitable format for electronic delivery to customer 104 using network 102 (e.g., video-on-demand). In some embodiments, media may include movies, video games, music, books, recorded books, and/or any specific type or types of material operable to communicate audio and/or visual information. For example, controller 100 may include a Web site that accepts requests for delivery of movies to customers 104.

Controller 100 represents an entity, such as a person, a group of persons, and/or any appropriate hardware and controlling logic, capable of delivering and/or arranging delivery of media to customers 104. In some embodiments, controller 100 may include a Web server capable of hosting a computerized Web page that transmits and receives information through network 102. Controller 100 may also include telephony equipment, computers, databases, a cable headend, satellite links, media players, or any other appropriate hardware and/or software able to communicate with customers 104, fulfillment centers 106, and stores 108 through network 102. Controller 100 may receive a request to rent media from customer 104 that has an associated subscriber account. Controller 100 selects a fulfillment center 106 or a store 108 to fulfill the request of customer 104.

Network 102 allows controller 100 to communicate with other networks, customers 104, fulfillments centers 106, and/or stores 108. Network 102 may include a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Network 102 may include any combination of gateways, routers, hubs, switches, access points, base stations, and any other hardware and/or software that may implement any suitable protocol or communication.

Customers 104 each represent an entity, such as a person, a group of persons, and/or any appropriate hardware and controlling logic, capable of requesting and/or receiving media by interacting with controller 100. In some embodiments, customers 104 may include Web browsers capable of accessing a computerized Web page to transmit and receive information through network 102. Customers 104 may include telephony equipment, computers, or any other appropriate device able to communicate with controller 100 through network 102. For example, customers 104 may transmit media requests to controller 100 through network 102. Customers 104 each may be associated with a subscriber account. The subscriber account includes information about a subscription plan in which customers 104 participate. When customer 104 participates in a subscription plan, a particular number of media items may be requested or used by customer 104 at a time. The subscription plan provides different manners in which customers 104 may request and/or receive media. For example, customers 104 request media in-store by visiting stores 108 or on-line using a computer. An on-line media request may originate from a real-time request from customer 104 or through automatically processing a queue of requests previously configured by customer 104. Upon fulfilling the media request, customers 104 receive the requested media through any suitable channel, such as delivery of CDs, DVDs, or the like through the mail, by removing the media from store 108, or by electronic delivery of media to customers 104 from controller 100, fulfillment centers 106, or stores 108 using network 102.

Fulfillment centers 106 each represent an entity, such as a person, a group of persons, and/or appropriate hardware and controlling logic, capable of fulfilling requests or invoices for media. In some embodiments, fulfillment centers 106 may include technology capable of transmitting and receiving information through network 102, for example, telephony equipment, computers, databases, a cable headend, satellite links, media players, or any other appropriate hardware and/or software. Furthermore, fulfillment centers 106 may include warehouses and central distribution facilities that maintain physical inventory of media for use by fulfillment centers 106 or for supply to stores 108.

Stores 108 each represent an entity, such as a person, a group of persons, and/or appropriate hardware and controlling logic, capable of fulfilling requests or invoices for media. In some embodiments, stores 108 may include technology capable of exchanging information through network 102, for example, telephony equipment, computers, databases, a cable headend, satellite links, media players, or any other appropriate hardware and/or software. Furthermore, stores 108 may include traditional movie and game rental operations, such as viewable shelves of media inventory and point-of-sale equipment, which accommodate in-store media requests. Stores 108 include media inventory 110a-110c (generally referred to as inventory 110) that may be allocated based on the mode of fulfillment. For example, some of the media may be on-line inventory 110a designated for customers 104 who make on-line requests while other media may be in-store inventory 110b designated for customers 104 that make in-store requests. Also, visiting inventory 110c may represent media that belongs to another store 108 or fulfillment center 106.

In operation, controller 100 interacts with customers 104 through network 102, fulfillment centers 106, and stores 108 to arrange for fulfillment of media requests. Controller 100 receives a media request from customer 104, and selects one of the inventory locations, a fulfillment center 106 or a store 108, to fulfill the request. For a selected store 108, controller 100 may also determine whether to fulfill the request through on-line inventory 110a, in-store inventory 110b, or visiting inventory 110c. In fulfilling the request, controller 100 may prioritize visiting inventory 110c to redirect visiting inventory 110c to its home store 108 when customer 104 returns the media.

System 10 contemplates various modifications, additions, or omissions. For example, controller 100 may receive the request from customer 104 in any suitable manner, such as customer 104 making a media request in store 108. Moreover, one or more functions performed by controller 100 or network 102 may be implemented in whole or in part by fulfillment centers 106 or stores 108. Additionally, system 10 may include any number of controllers 100, networks 102, customers 104, fulfillment centers 106, and stores 108. Any suitable logic comprising software, hardware, other logic, or any suitable combination of the preceding may perform the functions of any components in system 10.

Figure 2:
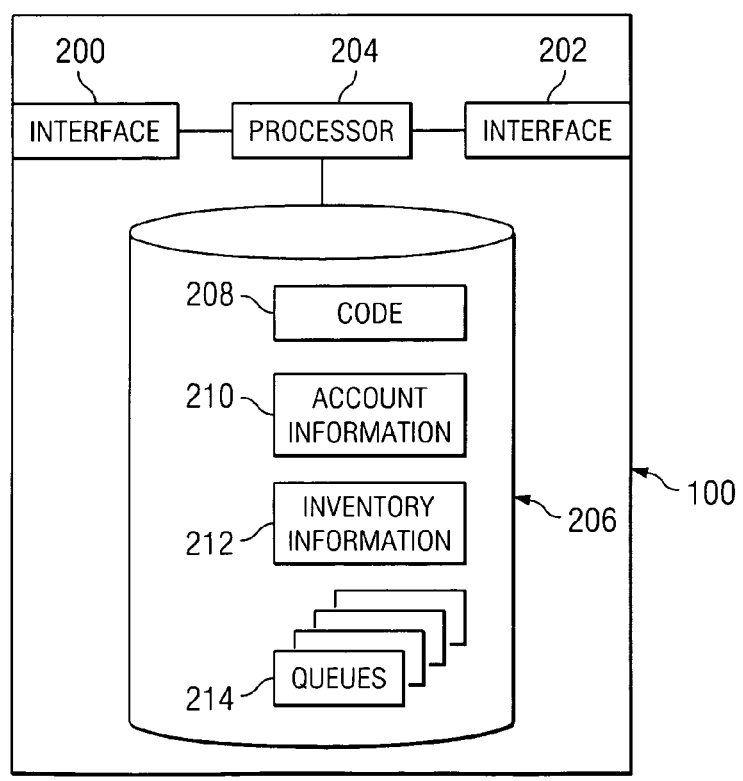
FIG. 2 illustrates a controller that supports the fulfillment of media requests.

FIG. 2 is a block diagram illustrating functional components of a particular embodiment of controller 100. In general, controller 100 communicates with customers 104, fulfillment centers 106, and stores 108 to identify and arrange fulfillment of media requests from customers 104. More specifically, controller 100 selects one of several possible inventory locations to fulfill the request and generally manages the allocation of inventory 110 in system 10. In the illustrated embodiment, controller 100 includes interfaces 200 and 202, a processor 204, and a memory 206.

In the illustrated embodiment, interface 200 is an inventory location interface and interface 202 is a customer interface. Interface 200 communicates with fulfillment centers 106 and stores 108, and interface 202 communicates with customers 104. When communicating with customers 104, interface 202 may exchange information regarding media requests, subscriber accounts, or other communication with customers 104. When communicating with fulfillment centers 106 or stores 108, interface 200 may exchange information related to the fulfillment of media requests, media availability, inventory update, inventory reallocation or other communication with stores 106 or fulfillment centers 108. Interface 200 and interface 202 represent any port or connection, real or virtual, including any suitable hardware and/or software that allow communication to and from elements linked to controller 100. Also, interfaces 200 and 202 may be a single interface or multiple interfaces depending on the particular configuration and design of controller 100.

Processor 204 controls the operation and administration of controller 100. For example, processor 204 processes information and/or commands received from interface 200, interface 202, and memory 206. Processor 204 includes any hardware and/or software that operate to control and process information. For example, processor 204 may be a microcontroller, a programmable logic device, a microprocessor, any suitable processing device, or any combination or number of the preceding. As discussed above, controller 100 may operate to host a Web page on the Internet.

Memory 206 stores, either permanently or temporarily, data and other information for processing by processor 204 and communication by interface 200 and interface 202. Memory 206 includes any one or a combination of volatile or nonvolatile local or remote devices suitable for storing information. For example, memory 206 may include random access memory (RAM), read only memory (ROM), magnetic storage devices, optical storage devices, or any other suitable information storage device or combination of these devices. Memory 206 may store information in one or more modules. For example, in the illustrated embodiment, memory 206 includes code 208, account information 210, inventory information 212, and queues 214. While memory 206 as illustrated includes particular data elements, it should be understood that memory 206 may maintain any suitable information for use in operation of controller 100.

Code 208 includes software, executable files, Web pages, graphical user interfaces (GUIs) and/or appropriate logic modules capable when executed to control the operation of controller 100. For example, code 208 may include Web pages for presentation to customers 104 to manage their media requests. Code 208 may also include executable files capable of processing delivery requests, inventory queries, inventory reallocations, and other functions for fulfillment centers 106 and/or stores 108.

Account information 210 includes information related to a particular customer 104. For example, account information 210 may include historical rental activity, account balances, customer preferences, payment information, customer satisfaction scores, and other information specific to the account for customer 104. In addition, account information 210 may include information related to the subscriber account of customer 104. The subscriber account includes such information as a total number of media items available to customer 104 at a time. For example, a subscriber account has an associated monthly fee that allows customer 104 to rent up to three media items at a time. Upon the return of a media item by customer 104, system 10 fulfills the next media request. In this example, customer 104 pays for three delivery slots that are closed upon fulfilling a rental request (in-store or on-line) and opened upon return of a media item.

Inventory information 212 indicates the availability of media at fulfillment centers 106 and stores 108. For example, inventory information 212 includes the identity and geographic locations of inventory locations (fulfillment centers 106 and stores 108) in system 10. Inventory information 212 maintains a count of different types of inventories 110 for each media title at each inventory location. Inventory information 212 may also include information regarding the store performance of stores 108, including a maximum number of on-line fulfillments allowed at store 108, accuracy and efficiency in meeting on-line requests, accounting information to credit revenue to store 108 for fulfilling on-line requests, and other similar information. Controller 100 updates inventory information 212 based on fulfilled requests, returned media, inventory updates and reconciliations, and other communications and activities in system 10. Thus, inventory information 212 may be based upon actual inventories. Alternatively or in addition, inventory information 212 may be based upon projections and forecasts of future inventories.

Queues 214 include information related to media selections by customers 104. The media selection that customer 104 stores in its associated queue 214 allows queue 214 to make media requests on behalf of customer 104. Therefore, customers 104 may make the media selections in advance of actually requesting the media. For example, customer 104 may configure queue 214 to include a certain number of media selections or pending requests. When a delivery slot is available, controller 100 processes queue 214 and selects an inventory location to fulfill the next request. Customers 104 may include any suitable number of pending requests in queue 214.

In operation, controller 100 receives a media request from a customer 104. The request may be received through interface 202 or retrieved from queue 214. Upon receiving the request, controller 100 selects an inventory location to fulfill the request, a fulfillment center 106 or a store 108. Controller 100 analyzes several factors to determine which inventory location to select. The selection may be based on enhancing the customer experience, such as quickly providing customer 104 with the media from the closest inventory location. For example, controller 100 may consider account information 210 and inventory information 212 in determining which inventory location to select. Account information 210 provides controller 100 information regarding customer 104 that makes the request, and inventory information 212 provides controller 100 with information regarding inventory locations and available media. For example, from account information 210, controller 100 determines the customer's location and from inventory information 212, controller 100 determines a location near the customer that has available inventory 110.

Controller 100 may be configured to select the inventory location based on a number of factors, such as customer satisfaction criteria, inventory type, store metrics, other suitable factors, or any combination of the preceding. For example, controller 100 may select the inventory location that will provide the media to customer 104 in the shortest time. This inventory location may be the closest store 108 to customer 104 or store 108 that has the media immediately available. Also, controller 100 may consider several pending requests in queue 214 of customer 104 to select one that is the most beneficial or optimal to fulfill.

Controller 100 may also consider the various types of inventory 110 at stores 108 in selecting the inventory location. Controller 100 may prioritize visiting inventory 110c over on-line inventory 110a. In an attempt to return visiting inventory 110c to its home store 108, controller 100 may select store 108 with more available visiting inventory 110c. Within fulfillment centers 106, controller 100 may prioritize visiting inventory 110c over general inventory 110.

Controller 100 may also select the inventory location based on store metrics. For example, store rankings on efficiency, accuracy of on-line fulfillment, or any suitable metric may determine which inventory location controller 100 selects. Additionally, the revenue credited to stores 108 for fulfilling on-line requests may influence a selection based on store metrics.

Based on all of the factors, including the closest inventory location to customer 104, the inventory location that can provide the media in the fastest time, inventory type, and store metrics, controller 100 qualifies available inventory locations and applies a ranking, weighting of factors, or other algorithm to select the inventory location. Controller 100 then selects the inventory location to fulfill the request and the selected inventory location fulfills the request.

Modifications, additions, or omissions may be made to controller 100. For example, memory 206 may include information in addition to code 208, account information 210, inventory information 212, and queue 214. As another example, controller 100 may include additional interfaces to allow for communication between other elements within system 10. Additionally, any suitable logic, comprising software, hardware, other logic, or any suitable combination of the preceding may perform the functions of controller 100.

Figure 3:
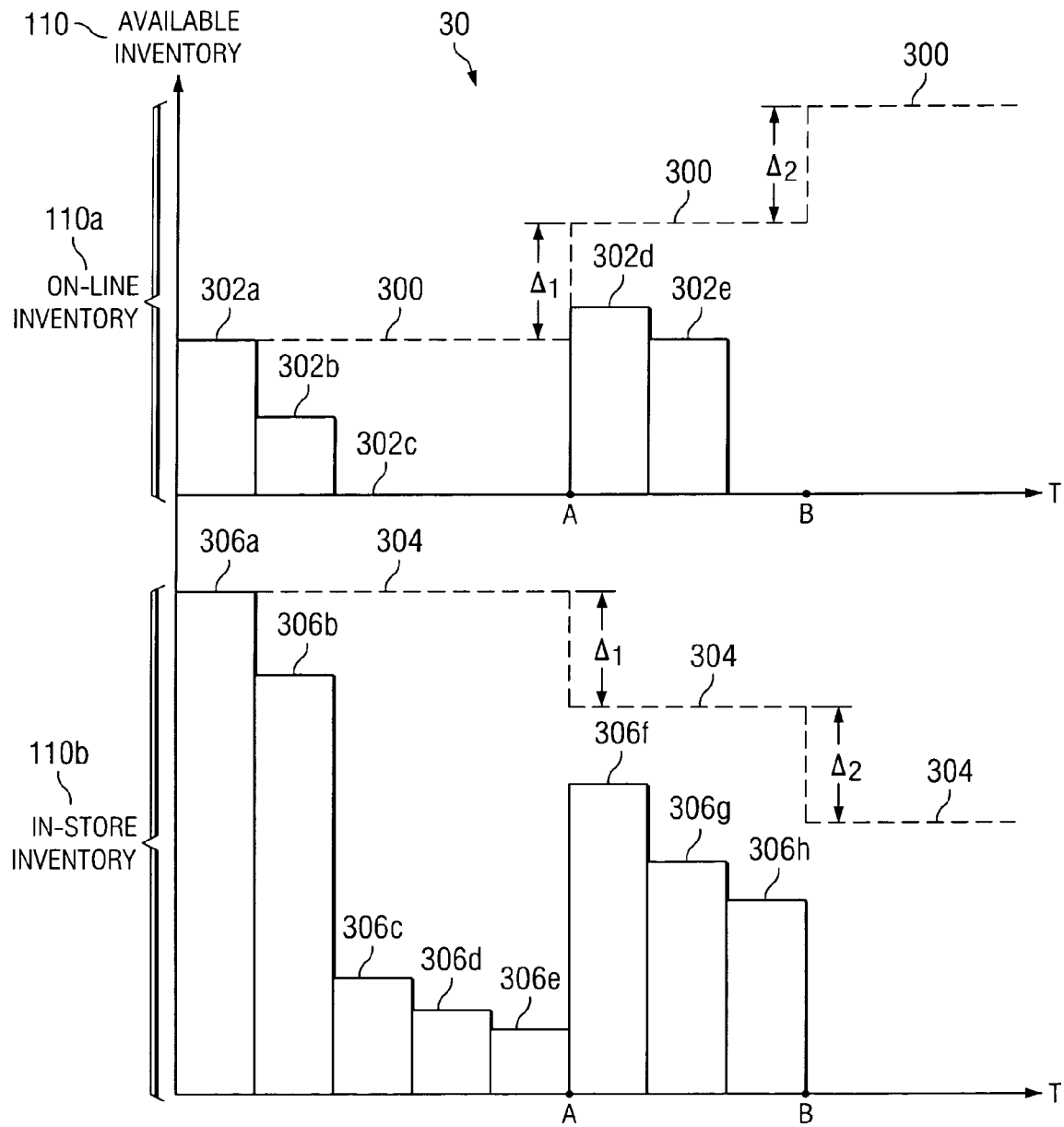
FIG. 3 is a graph illustrating the reallocation of media.

FIG. 3 is a graph 30 illustrating the reallocation of media over time in a store 108. The inventory count of available inventory 110, which includes on-line inventory 110a, in-store inventory 110b, or other suitable inventory 110, is shown on the vertical axis and time on the horizontal axis of graph 30. Line 300 represents the maximum count of on-line inventory 110a. Line 304 represents the maximum count of in-store inventory 110b. Lines 300 and 304 may change over time based on a reallocation of inventory 110 for store 108. The fluctuation of line 300 and line 304 may depend on a comparison of projected in-store activity versus actual in-store rental activity. Controller 100 may perform this reallocation based on projections made about on-line and in-store activity by considering the past histories of on-line and in-store activity of similar media titles. Line 300 and line 304 may be determined by any projection information, randomly selected information, or any suitable information.

When initially designated, available media count 302a designated as on-line inventory 110a coincides with line 300, and available media count 306a designated as in-store inventory 110b coincides with line 304. Over time, customers 104 make media requests through on-line and in-store channels and the available media decreases. Available media count 302b represents the number of available on-line inventory 110a after a period of time, the available media decreases to zero at available media count 302c, and store 108 does not have any on-line inventory 110a of the media title. The media designated as in-store inventory 110b also decreases over time. Available media counts 306b-306e represent the decrease of in-store inventory 110b. For example, the maximum count of inventory 110 is available for a media title released on a Tuesday before customers 104 make requests. Available media count 302a represents the total available on-line inventory 110a and available media count 306a represents the total available in-store inventory 110b. As customers 104 begin making requests for the media title, the available media count decreases. By close of business on Thursday, on-line inventory 110a has decreased to available media count 302b and in-store inventory 110b has decreased to available media count 306b. By the end of Friday, on-line inventory 110a has an available media count 302c of zero and in-store inventory 110b decreases to available media count 306c. In-store inventory 110b continues to decrease on Saturday and Sunday, but an available media count 306e remains at the time an evaluation occurs.

At point A, controller 100 determines the actual in-store rental activity of the media title. For example, the actual in-store activity may be determined after the media is available for a week, after the media is available for five days, or for any suitable period of time. The actual in-store rental activity is evaluated to determine whether inventories 110a and 110b should be reallocated. The evaluation includes comparing the maximum amount of available media and the actual in-store rental activity, considering expected demand that is not as high based on historical trends that show demand decreases some time after release of a media title, or any suitable evaluation. In the illustrated embodiment, available media count 306e indicates available in-store inventory 110b when the evaluation occurs, while on-line inventory 110a is zero. Because there is in-store inventory 110b "left-on-shelf," controller 100 determines to allocate more media to on-line inventory 110a. The total amount of available inventory 110 for distribution through both channels remains the same, but the particular allocation between in-store inventory 110b and on-line inventory 110a changes. After reallocation, on-line inventory 110a increases by $?_1$, while in-store inventory 110b decreases by $?_1$.

Customers 104 continue to request media for distribution through on-line and in-store channels over time. The activity continues after point A and the available media decreases as customers 104 continue to make requests. The actual in-store rental activity of media distribution is reevaluated at point B. For example, the reevaluation may occur a week after the initial evaluation, a month, or at any suitable time. Again, the evaluation may include comparing the amount of available media to the actual in-store rental activity, considering expected demand that is not as high based on historical trends that show demand decreases some time after release of a media title, or any suitable evaluation. At point B, in-store inventory 110b exceeds the demand for media through in-store requests, available media count 306h, while on-line inventory 110a does not meet the demand. In the illustrated embodiment, on-line inventory 110a and in-store inventory 110b is reallocated based on the comparison of projected activity and actual in-store rental activity. In-store inventory 110b decreases by $\Delta_2$ and on-line inventory 110a increases by $\Delta_2$. The reevaluation may continue additional times by comparing actual in-store rental activity to the projected activity. Reallocation of on-line inventory 110a and in-store inventory 110b may occur based on the reevaluations.

Modifications, additions, or omissions may be made to graph 30. For example, inventory 110 may have further designations in addition to on-line inventory 110a and in-store inventory 110b. As another example, on-line inventory 110a may decrease while in-store inventory 110b increases. Also, the total available inventory 110 may adjust in addition to the reallocation of on-line inventory 110a and in-store inventory 110b. Over time, the total available inventory 110 may decrease and the designations for on-line inventory 110a and in-store inventory 110b decrease accordingly. Alternatively, the total available inventory 110 and the designations of on-line inventory 110a and in-store inventory 110b may remain the same after the evaluation and/or reevaluations. Additionally, any suitable logic comprising software, hardware, other logic, or any suitable combination of the preceding may perform the reallocation of available media.

Figure 4:
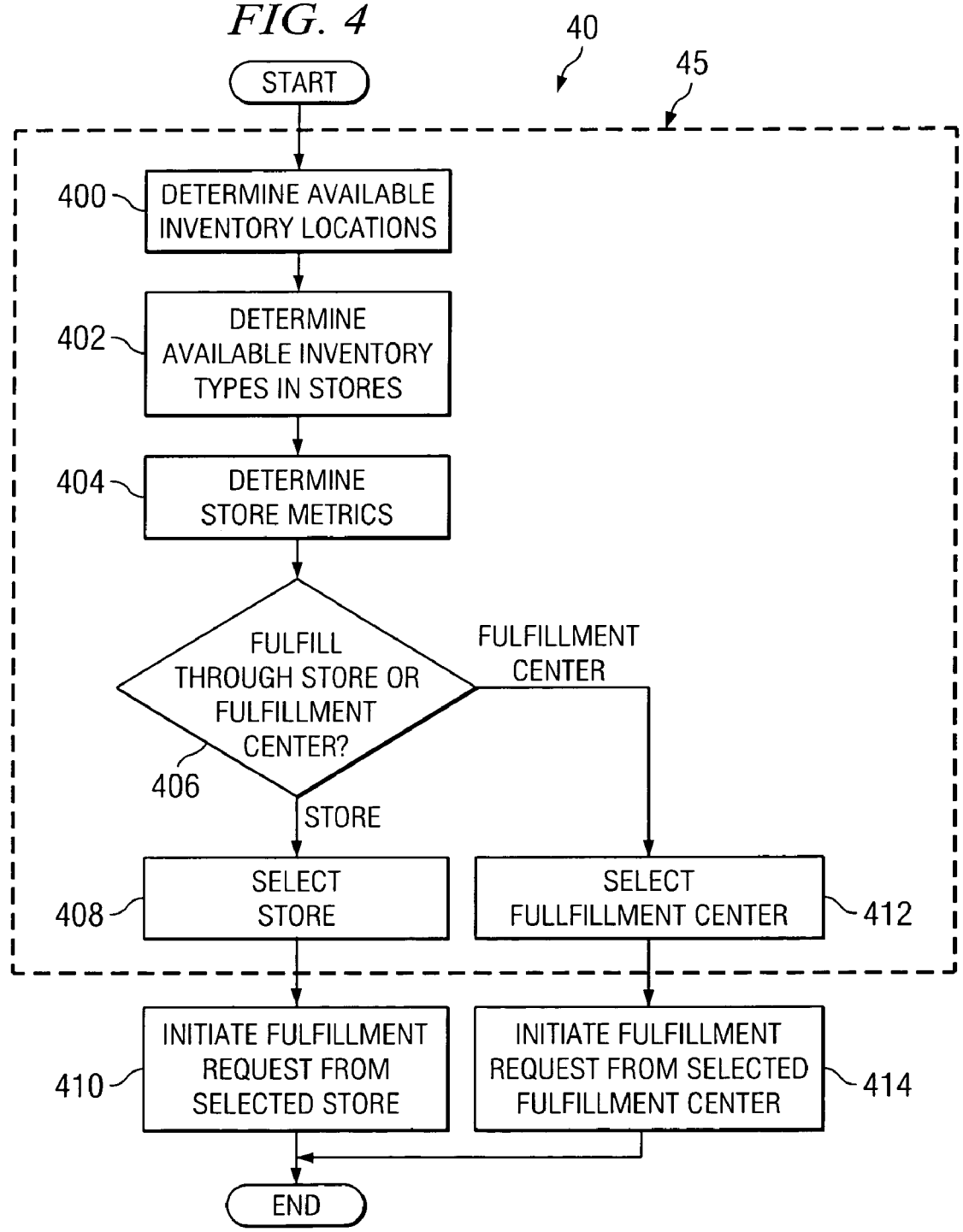
FIG. 4 is a flowchart illustrating the fulfillment of media requests.

FIG. 4 is a flowchart 40 illustrating fulfilling a media request. Controller 100 determines available inventory locations at step 400. Controller 100 considers fulfillment centers 106 and stores 108 based on geographical factors that may provide customer 104 the media in the shortest time. At step 402, controller 100 determines available inventory types in fulfillment centers 106 and stores 108. Controller 100 initially allocates inventory 110 to fulfillment centers 106 and stores 108 based on demographics, historical demands, or any suitable factor. Controller 100 further designates inventory 110 distributed to particular inventory locations. For example, controller 100 may determine that a particular store 108 receives fifty total copies of a media title, ten copies may be designated as on-line inventory 110a and forty copies may be designated as in-store inventory 110b. At step 404, controller 100 determines metrics of stores 108, such as the efficiency and accuracy of store 108. Controller 100 may consider other factors to select the inventory location in addition to the factors in steps 400-404. Furthermore, steps 400-404 may occur in parallel, sequentially, or in any suitable order.

Controller 100 determines whether to fulfill the request through store 108 or fulfillment center 106 at step 406. To determine which inventory location to fulfill the media request, a number of considerations are analyzed including account information 210 and inventory information 212. Controller 100 may consider any suitable information to select an inventory location to fulfill the media request. Account information 210 may include historical rental activity, account balances, preferences, payment information, customer satisfaction scores, or any suitable information specific to the account for customer 104. Inventory information 212 includes the identity and geographic locations of inventory locations, type of inventory 110 for each media title at each inventory location, store metrics, or any other suitable information regarding inventory locations. By analyzing account information 210 and inventory information 212, controller 100 attempts to select inventory locations that can fulfill the request.

If controller 100 determines that stores 108 should fulfill the request, controller 100 selects a store 108 to fulfill the request at step 408. In an embodiment, controller 100 selects the inventory location to provide the best customer experience or provide the media to customer 104 in the shortest amount of time. For example, controller 100 may select a store 108 closest to customer 104 to fulfill a request made on-line through queue 214. Controller 100 initiates the fulfillment of the request from the selected store 108 at step 410.

If controller 100 determines that fulfillment centers 106 should fulfill the request, controller 100 selects a fulfillment center 106 to fulfill the request in step 412. For example, if a store 108 is not within a certain distance to customer 104, controller 100 may select a fulfillment center 106 to fulfill the request made on-line. Controller 100 initiates fulfillment of the request from the selected fulfillment center 106 at step 414.

Modifications, additions, or omissions may be made to flowchart 40. Controller 100 may perform steps 45 in any suitable order. For example, controller 100 may determine whether to fulfill the request through stores 108 or fulfillment centers 106 before determining the available inventory in stores 108 and metrics of store 108. Additionally, if on-line inventory 110a is not available in a store 108, the request may be fulfilled from another store 108 instead of a fulfillment center 106. As another example, when controller 100 selects the inventory location to fulfill the request, controller 100 may prefer stores 108 over fulfillment centers 106 in fulfilling the request. How the criteria are analyzed may change depending on where the request is received. For example, if a request is received in-store, controller 100 does not have to go through the rules associated with selecting an inventory location to fulfill the request; store 108 that receives the request can fulfill the customer's in-store request. Additionally, steps may be performed in any suitable order and some or all steps described as occurring at controller 100 may be performed by other components in system 10.

Figure 5:
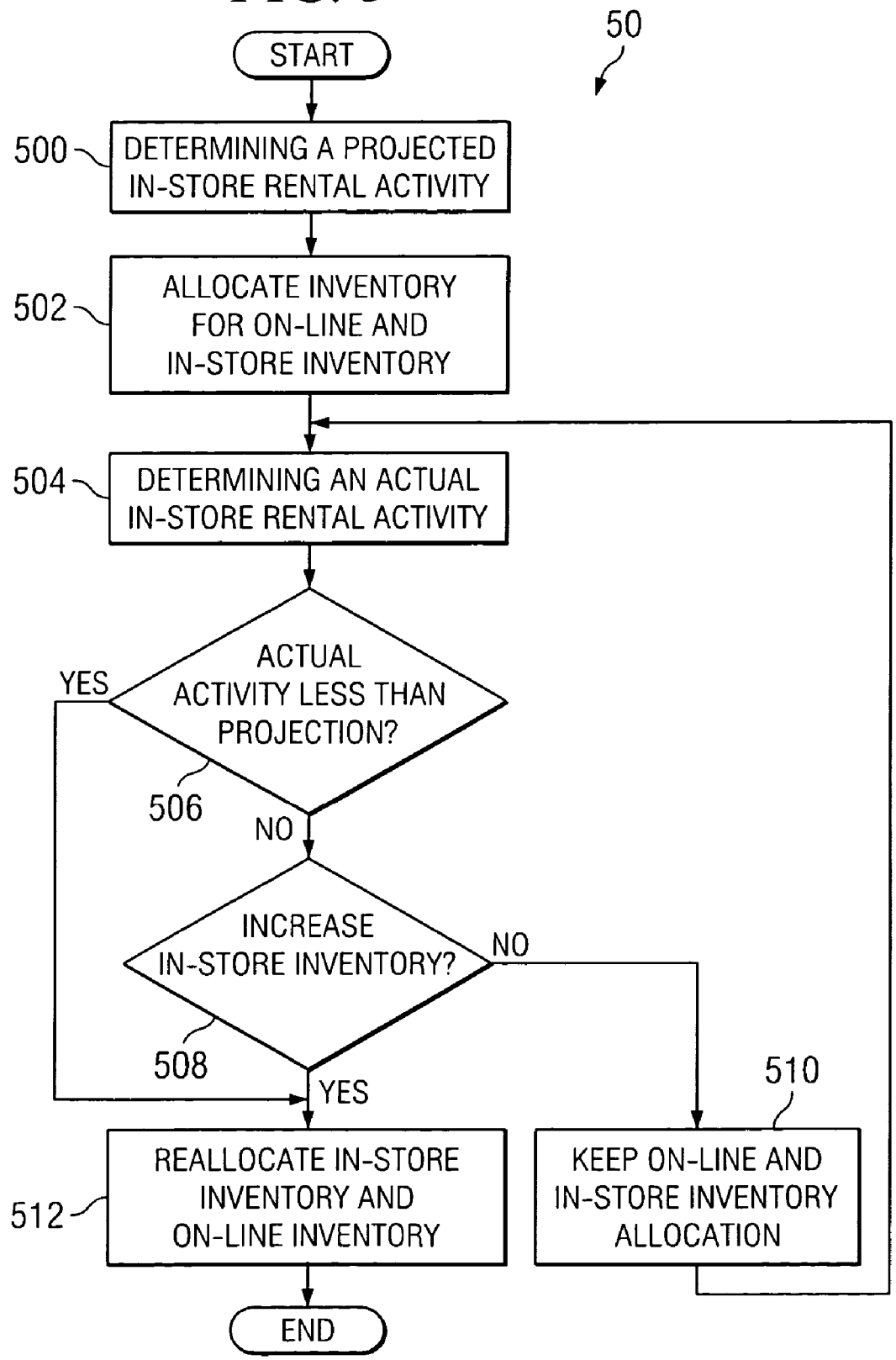
FIG. 5 is a flowchart illustrating the reallocation of media.

FIG. 5 is a flowchart 50 illustrating the reallocation of media. Controller 100 may initially project on-line inventory 110a of a total available inventory 110 for on-line fulfillment and project in-store inventory 110b for in-store fulfillment. Based on this projection or using some other technique, controller 100 allocates inventory 110 at step 502. Controller 100 tracks the actual in-store rental activity at step 504. Tracking the actual in-store rental activity may occur over a specific period of time. For example, controller 100 may track the actual in-store rental activity over a week, compare the projections and actual activity, and then continue tracking the actual in-store rental activity. Controller 100 tracks the actual in-store rental activity for any configurable period of time.

At step 506, controller 100 compares the actual activity of in-store inventory 110b to the projected activity of in-store inventory 110b. If the actual activity of in-store inventory 110b exceeds the projected activity of in-store inventory 110b, controller 100 may keep the same designation of inventory 110 or increase in-store inventory 110b. However, if the actual in-store rental activity is less than the projected activity, the designation of inventory 110 as on-line inventory 110a and in-store inventory 110b is reallocated. The amount designated as on-line inventory 110a increases, and the amount designated for in-store inventory 110b decreases accordingly. The total amount of inventory 110 remains the same, but the designation of inventory 110 as on-line inventory 110a or in-store inventory 110b is adjusted based on the comparison of the actual in-store rental activity and the projected activity.

Modifications, additions, or omissions may be made to flowchart 50. For example, tracking the actual in-store rental activity in a store 108 may continue to occur following the reallocation of inventory 110. Controller 100 performs allocation of inventory 110, reallocation of inventory 110, or any suitable function for stores 108 and fulfillment stores 106 for each media title offering in system 10. Additionally, steps may be performed in any suitable order and performed by other components in system 10.

Although the present invention has been described with several embodiments, a myriad of changes, variations, alterations, transformations, and modifications may be suggested one skilled in the art, and it is intended that the present invention encompass such changes, variations, alterations, transformations, and modifications as fall within the scope of the appended claims.

What is claimed is:

1. A method performed on a computer for fulfilling a media request, comprising:
    allocating a first portion of inventory for on-line fulfillment to a particular inventory location;
    allocating a second portion of inventory for in-store fulfillment to the particular inventory location;
    determining in-store rental activity of the second portion of inventory, wherein
    determining in-store rental activity comprises:
        determining a protected in-store rental activity of the second portion of inventory based on past in-store rental activity;
        determining an actual in-store rental activity of the second portion of inventory; and
        comparing the protected in-store rental activity and the actual in-store rental activity to determine whether to reallocate the first and second portions of inventory;
    reallocating the first and second portions of inventory in accordance with the determined in-store rental activity;
    receiving, at a computer, a media request associated with a subscriber account; and selecting, by the computer, one of a plurality of inventory locations to fulfill the media request, wherein at least one of the inventory locations accommodates in-store media rental requests.

2. The method of claim 1, wherein receiving the media request comprises processing a configurable queue of requests associated with the subscriber account.

3. The method of claim 1, wherein the media request comprises a request to rent a movie title.

4. The method of claim 1, further comprising increasing the first portion of inventory in accordance with the determined in-store rental activity.

5. The method of claim 1, wherein selecting one of a plurality of inventory locations comprises determining a geographic location of a customer associated with the media request.

6. The method of claim 1, wherein selecting one of a plurality of inventory locations comprises determining performance data associated with inventory locations that are stores.

7. The method of claim 1, wherein selecting one of a plurality of inventory locations comprises:
    determining a geographic location of a customer associated with the media request; and
    determining performance data associated with inventory locations that are stores.

8. The method of claim 1, wherein selecting one of a plurality of inventory locations comprises selecting one of a plurality of inventory locations based on availability of inventory for redistribution to another inventory location.

9. The method of claim 1, wherein selecting one of a plurality of inventory locations comprises selecting one of a plurality of inventory locations based on classification of available inventory, wherein the available inventory comprises in-store inventory, on-line inventory, and visiting inventory.

10. A system for fulfilling a media request, comprising:
    a plurality of computers operable to make media requests associated with subscriber accounts; and
    a controller comprising hardware, the controller operable to:
        allocate a first portion of inventory for on-line fulfillment to a particular inventory location and allocate a second portion of inventory for in-store fulfillment to the particular inventory location;
        determine in-store rental activity of the second portion of inventory;
        determine a protected in-store rental activity of the second portion of inventory based on past in-store rental activity;
        determine an actual in-store rental activity of the second portion of inventor;

compare the protected in-store rental activity and the actual in-store rental activity to determine whether to reallocate the first and second portions of inventory;

reallocate the first and second portions of inventory in accordance with the determined in-store rental activity; and select a plurality of inventory locations to fulfill the media requests, wherein at least one of the inventory locations accommodates in-store media rental requests.

11. The system of claim 10, wherein the plurality of customers make requests by configuring a plurality of queues established for the subscriber accounts, each queue maintaining a plurality of pending requests for a corresponding subscriber account.

12. The system of claim 10, wherein the plurality of inventory locations comprise:
a plurality of stores to accommodate in-store media requests; and
a plurality of fulfillment centers to accommodate on-line media requests.

13. The system of claim 10, wherein the controller is operable to increase the first portion of inventory in accordance with the determined in-store rental activity.

14. The system of claim 10, wherein the controller is operable to determine a geographic location of a customer associated with the media request.

15. The system of claim 10, wherein the controller is operable to determine performance data associated with inventory locations that are stores.

16. The system of claim 10, wherein the controller is operable to determine a geographic location of a customer associated with the media request, and determine performance data associated with inventory locations that are stores.

17. The system of claim 10, wherein the controller is operable to select one of a plurality of inventory locations based on availability of inventory for redistribution to another inventory location.

18. The system of claim 10, wherein the controller is operable to select one of a plurality of inventory locations based on classification of available inventory, wherein the available inventory comprises in-store inventory, on-line inventory, and visiting inventory.

19. A controller, comprising:
a memory operable to store inventory information and account information, the inventory information indicating an allocation of media at a plurality of inventory locations, wherein at least one of the locations accommodates in-store media rental requests, the account information indicating a plurality of subscriber accounts;
a network interface operable to receive a media request; and
a processor operable to:
associate the media request with a particular subscriber account using the account information;
allocate a first portion of inventory for on-line fulfillment to a particular inventory location;
allocate a second portion of inventory for in-store fulfillment to the particular inventory location;
determine in-store activity of the second portion of inventory;
determine a projected in-store rental activity of the second portion of inventory based on past in-store rental activity;

determine an actual in-store rental activity of the second portion of inventory;
compare the projected in-store rental activity and the actual in-store rental activity to determine whether to reallocate the first and second portions of inventory;
reallocate the first and second portions of inventory in accordance with the determined in-store rental activity; and
select one of a plurality of inventory locations to fulfill the request using the inventory information.

20. The controller of claim 19, wherein the memory comprises a queue having pre-configured media requests associated with the particular subscriber account, the queue operable to provide the media request to the processor.

21. The controller of claim 19, wherein the processor is operable to determine a geographic location of a customer associated with the media request, and determine performance data associated with inventory locations that are stores.

22. The controller of claim 19, wherein the processor is operable to select an inventory location based on classification of available inventory, wherein the available inventory comprises in-store inventory, on-line inventory, and visiting inventory.

23. A method performed on a computer for fulfilling a media request, comprising:
allocating a first portion of inventory for on-line fulfillment to a particular inventory location;
allocating a second portion of inventory for in-store fulfillment to the particular inventory location;
receiving, at a computer, a media request associated with a subscriber account, the media request comprising a request to rent a movie title, wherein receiving the request comprises processing a configurable queue of requests associated with the subscriber account;
selecting, by the computer, one of a plurality of inventory locations to fulfill the request, at least one of the inventory locations accommodating in-store media requests, wherein selecting one of a plurality of inventory locations comprises:
determining a geographic location of a customer associated with the request;
determining performance data associated with inventory locations that are stores;
selecting one of a plurality of inventory locations based on classification of available inventory, wherein the available inventory comprises in-store inventory, on-line inventory, and visiting inventory;
determining in-store rental activity of the second portion of inventory, wherein determining in-store rental activity comprises:
determining a projected in-store rental activity of the second portion of inventory based on past in-store rental activity;
determining an actual in-store rental activity of the second portion of inventory; and
comparing the projected in-store rental activity and the actual in-store rental activity to determine whether to reallocate the first and second portions of inventory;
reallocating the first and second portions of inventory in accordance with the determined in-store rental activity; and
increasing the first portion of inventory in accordance with the determined in-store rental activity.

* * * * *